United States Patent [19]
Reeley

[11] Patent Number: 6,166,627
[45] Date of Patent: Dec. 26, 2000

[54] MOBILE DETECTION AND ALERT SYSTEM

[76] Inventor: Ronald B. Reeley, 6 Royal St. SW., Suite #460, Leesburg, Va. 20175

[21] Appl. No.: 09/437,170

[22] Filed: Nov. 9, 1999

Related U.S. Application Data

[60] Provisional application No. 60/144,631, Jul. 20, 1999.

[51] Int. Cl.[7] .................................................. B60R 25/10
[52] U.S. Cl. ........................ 340/426; 340/539; 340/988; 342/457
[58] Field of Search .................................. 340/988, 990, 340/426, 539; 342/457, 357; 307/10, 2; 455/422; 701/213, 300

[56] References Cited

U.S. PATENT DOCUMENTS

| | | | |
|---|---|---|---|
| 3,978,479 | 8/1976 | Schmitz | 340/502 |
| 4,023,139 | 5/1977 | Samburg | 340/506 |
| 4,446,454 | 5/1984 | Pyle | 340/538 |
| 4,577,182 | 3/1986 | Millsap et al. | 340/539 |
| 4,794,368 | 12/1988 | Grossheim et al. | 340/525 |
| 4,857,912 | 8/1989 | Everett, Jr. et al. | 340/825.3 |
| 5,081,667 | 1/1992 | Drori et al. | 455/404 |
| 5,113,427 | 5/1992 | Ryoichi et al. | 455/31.2 |
| 5,223,844 | 6/1993 | Mansell et al. | 342/357 |
| 5,334,974 | 8/1994 | Simms et al. | 340/990 |
| 5,382,943 | 1/1995 | Tanaka | 340/539 |
| 5,450,321 | 9/1995 | Crane | 701/35 |
| 5,515,043 | 5/1996 | Berard et al. | 340/988 |
| 5,557,254 | 9/1996 | Johnson et al. | 340/426 |
| 5,587,701 | 12/1996 | Hess | 340/541 |
| 5,739,747 | 4/1998 | Flick | 340/426 |
| 5,892,442 | 8/1999 | Ozery | 340/539 |
| 6,028,505 | 2/2000 | Drori | 340/429 |

FOREIGN PATENT DOCUMENTS 2266800  11/1993  United Kingdom .

*Primary Examiner*—Brent A. Swarthout
*Attorney, Agent, or Firm*—Richard C. Litman

[57] ABSTRACT

A mobile detection and alert vehicle tracking and security system for an individual vehicle as well as a plurality of individual vehicles in a given security area. The mobile detection and alert system provides round-the-clock vehicle security, allowing immediate response in case of vehicle theft, an accident, vehicle breakdown, or other emergency. Guardian and tracking functions are provided through keyboard control units which are installed in vehicles to be monitored. The keyboard control units communicate with a central monitoring facility in at least one-way, and preferably two-way, communication. Preferably, the keyboard control unit provides vehicle theft and intrusion protection using an in-vehicle alarm and security system linked to the central monitoring facility by a transceiver in the keyboard control unit.

16 Claims, 5 Drawing Sheets

MOBILE DETECTION AND ALERT SYSTEM

CROSS-REFERENCE TO RELATED APPLICATION

This application claims the benefit of U.S. Provisional Patent Application Serial No. 60/144,631, filed Jul. 20, 1999.

BACKGROUND OF THE INVENTION

1. Field of the Invention

The present invention relates generally to security systems and, more particularly, to a security system for detecting unauthorized intrusion into a vehicle as well as the detecting of a hazardous condition existing in that vehicle and providing notification of such unauthorized intrusion or hazardous condition.

2. Description of Related Art

The theft of individual vehicles such as automobiles, recreational vehicles, trailers, boats, etc., as well as items from automobiles, recreational vehicles, trailers, boats, etc., has grown to alarming proportions in recent times. Several approaches have been adopted in an attempt to combat theft of items from individual vehicles but most if not all approaches have required the owner to be in the area to monitor the system of his own vehicle. The related art is represented by the following patents of interest.

U.S. Pat. No. 3,978,479, issued on Aug. 31, 1976 to Lawrence S. Schmitz, describes a security system concept suitable for responding to remote and locally initiated alarm conditions to initiate local audible and voice communication features as well as initiate automatic communications with remote communications centers such that the alarm condition is clearly identified and communicated to assure an appropriate and timely response. Schmitz does not suggest a mobile detection and alert system according to the claimed invention.

U.S. Pat. No. 4,023,139, issued on May 10, 1977 to Gene Samburg, describes a security control and alarm system for each of plural, remote protected facilities which is monitored and controlled solely by a central station and permits elimination of private guards at each remote facility while affording greatly improved security monitoring, alarm, and control functions. Samburg does not suggest a mobile detection and alert system according to the claimed invention.

U.S. Pat. No. 4,446,454, issued on May 1, 1984 to Ronald E. Pyle, describes a security system including a primary monitoring unit including intrusion detection sensors disposed proximate the entry points of a residence. Pyle does not suggest a mobile detection and alert system according to the claimed invention.

U.S. Pat. No. 4,577,182, issued on Mar. 18, 1986 to James W. Millsap et al., describes an alarm system in which an alarm condition causes a cellular transceiver to automatically transmit a telephone call to an alarm monitoring station by over-the-air transmission of a signal to a cellular site. Millsap et al. do not suggest a mobile detection and alert system according to the claimed invention.

U.S. Pat. No. 4,857,912, issued on Aug. 15, 1989 to Hobart R. Everett, Jr. et al., describes a multi-sensor detection, verification, and intelligent assessment capability for a mobile security robot or stationary alarm system which allows the system to exhibit a high probability of detection with the ability to distinguish between actual and nuisance alarms. Everett, Jr. et al. does not suggest a mobile detection and alert system according to the claimed invention.

U.S. Pat. No. 5,081,667, issued on Jan. 14, 1992 to Ze'ev Drori et al., describes a system that interfaces between a variety of vehicle security systems and most cellular communication systems whether already sold and installed in vehicles or yet to be marketed. Drori et al. do not suggest a mobile detection and alert system according to the claimed invention.

U.S. Pat. No. 5,113,427, issued on May 12, 1992 to Kimura Ryoichi et al., describes a radio-signal-responsive vehicle device control system which employs a small size receiver unit that can receive a calling signal from a general telephone unit, for remotely controlling an automobile-mounted device. Ryoichi et al. do not suggest a mobile detection and alert system according to the claimed invention.

U.S. Pat. No. 5,382,943, issued on Jan. 17, 1995 to Mutuo Tanaka, describes a remote monitoring apparatus for use in a security control system, the apparatus including a plurality of different surveillance sensors accommodated in an enclosure case that can be easily and inexpensively installed at a location of a monitored site with no undesired effects on the appearance of the monitored object. Tanaka does not suggest a mobile detection and alert system according to the claimed invention.

U.S. Pat. No. 5,450,321, issued on Sep. 12, 1995 to Harold E. Crane, describes a dynamic interactive fully automated realtime management system for enhancing the management and technical operating efficiency of powered vehicles. Crane does not suggest a mobile detection and alert system according to the claimed invention.

U.S. Pat. No. 5,557,254, issued on Sep. 17, 1996 to Sam Johnson et al., describes a security system installed in a vehicle which is in telecommunication with a central monitoring station to communicate alarm conditions to the central monitoring station, and to receive directives from the central monitoring station. Johnson et al. do not suggest a mobile detection and alert system according to the claimed invention.

U.S. Pat. No. 5,587,701, issued on Dec. 24, 1996 to Brian K. Hess, describes a reporting alarm system which utilizes a two-way paging device to communicate between a centralized sensor station and a security monitoring center. Hess does not suggest a mobile detection and alert system according to the claimed invention.

Great Britain Patent document 2,266,800, published on Nov. 10, 1993, describes a wireless solar powered radio external audible fire and intruder warning alarm system. Great Britain '800 does not suggest a mobile detection and alert system according to the claimed invention.

None of the above inventions and patents, taken either singly or in combination, is seen to describe the instant invention as claimed.

SUMMARY OF THE INVENTION

The present invention is a mobile detection and alert system for an individual vehicle as well as a plurality of individual vehicles in a given security area. The mobile detection and alert system provides round-the-clock vehicle security, allowing immediate response in case of vehicle theft, an accident, vehicle breakdown, or other emergency. Guardian and tracking functions are provided through keyboard control units which are installed in vehicles to be monitored. The keyboard control units communicate with a central monitoring facility in at least one-way, and preferably two-way, communication. Preferably, the keyboard control unit provides vehicle theft and intrusion protection using an in-vehicle alarm and security system linked to the central monitoring facility by a transceiver in the keyboard control unit.

The keyboard control unit is mounted in a housing in a sidewall of the vehicle. The size of the housing is suitably designed insofar as it may be conveniently fixed in a convenient location according to the desires of the user. The keyboard control unit is powered by the vehicle's battery or an external power source and includes a power converter for converting alternating current (AC) power to direct current (DC) power according to the power source employed. The keyboard control unit may receive power from an alternate source of power, such as a backup battery. The keyboard control unit also includes a vehicle power sensing means which may include a relay or other similar circuit. This power sensing means detects failure and/or restoration of the vehicle DC electrical power or external AC electrical power. Upon detection of electrical failure, the keyboard control unit activates a distress message through speakers internally and externally of the vehicle to attract the attention of the vehicle occupants or any local population, as well as immediately informing the central monitoring facility of the failure and/or restoral of vehicle electrical power, immediately establishing two-way communication with the central monitoring facility, and immediately paging a vehicle occupant carrying a paging device associated with the mobile detection and alert system.

The keyboard control unit includes a display module including an alphanumeric display. The display module provides means for displaying requested information and verifying operator input. While a liquid crystal display is suitable for this purpose, any display configuration known in the art may also be employed. The keyboard control unit includes a keypad which functions as an operator interface device allowing the operator to input data and to control the keyboard control unit. The keypad also includes a plurality of multi-function control keys.

The keyboard control unit includes a central processing unit (CPU). The CPU includes sufficient memory to store both non-variable data related to the region of vehicle operation and variable data related to current conditions. The keypad is connected to the CPU to provide input data and operator commands to the CPU. The display module is connected to the CPU to supply information output to the operator and to supply operator interface information.

Major known electrical components are mounted within the keyboard control unit. Such components include a printed circuit board mounted in firm support within the keyboard control unit. The circuit board carries certain coupling and driver electronics with the CPU, read-only memories (ROM) and random access memories (RAM). In general, the ROM memories are used to contain instructions and programs while the RAM memories are employed for operating and working data. Of course, movement and process of instructions as well as data is controlled and accomplished by the CPU. The CPU is connected to all the keys on the keypad and is variously connected to the other elements of the keyboard control unit. The memories are connected to the CPU through several signal paths.

The keyboard control unit includes an input unit responsive to an event or condition associated with the vehicle, and that provides information describing the event or condition to the central monitoring facility. An event or condition associated with the vehicle may include unauthorized entry, glass breakage, fire, smoke, unauthorized movement, temperature conditions, carbon monoxide conditions, interior temperature conditions, battery temperature conditions, transmission temperature conditions, levelling jack conditions, satellite antenna conditions, cargo door conditions, etc. Such events or conditions are detected by a plurality of sensors operatively associated with the keyboard control unit, each sensor being structured to be actuated by the occurrence of a predetermined event. The keyboard control unit also has a satellite receiver, preferably a Global Positioning System (GPS) receiver, responsive to navigation signals transmitted by a satellite navigation system, and providing information describing the vehicle's location based on the navigation signals.

Also, the keyboard control unit has a keyboard control unit controller which is responsive to the input unit and the satellite receiver. The keyboard control unit controller includes a transceiver for transmitting and receiving information on a communications link, as well as a phone voice module which provides user interface via any touch tone standard voice grade phone line, for the purpose of system interrogation, remote arming/disarming, remote control of generator and temperature controls, in addition to uploading and downloading program information, the information transmitted on the communications link or the phone voice module including both the information describing the event or condition and the information describing the vehicle's location, the keyboard control unit controller automatically inserting the information describing the vehicle's location into the information transmitted onto the communications link or the phone voice module. The information received on the communications link or the phone voice module includes communications from the central monitoring facility or a wireless telephone. The satellite receiver is adapted to receive and decode signals transmitted by the central monitoring facility, a wireless telephone, a telephone connected to any touch tone standard voice grade phone line, or a remote control transmitter. Upon receipt of a valid transmitted signal, the receiver outputs an appropriate signal to the keyboard control unit controller for disabling or enabling associated relays. To preserve the data contents of volatile memory in the keyboard control unit controller, a memory back-up battery is provided. A GPS antenna is provided external to the keyboard control unit controller.

The communications link is preferably implemented as a conventional analog or digital cellular telephone link, but of course need not be so limited. The central monitoring facility may appropriately summon help in the form of police, a fire truck, an ambulance, a wrecker, or other appropriate help. In addition, the central monitoring facility may communicate with the vehicle occupants to determine their condition. Each keyboard control unit preferably includes means for determining the present location of the vehicle in which it is installed. Preferably, this means for determining the location is a GPS receiver, not only for its accuracy but because the location information transmitted from GPS satellites is provided free of cost.

The mobile detection and alert system includes a plurality of sensor means for detecting events or conditions such as unauthorized entry, glass breakage, fire, smoke, unauthorized movement, temperature conditions, carbon monoxide conditions, interior temperature conditions, battery temperature conditions, transmission temperature conditions, levelling jack conditions, satellite antenna conditions, cargo door conditions, etc. The plurality of sensor means are operatively associated with the keyboard control unit, each sensor means being structured to be actuated by the occurrence of a predetermined event. Upon actuation, each sensor means activates a corresponding distress message through speakers internally and externally of the vehicle to attract the attention of the vehicle occupants or any local population, as well as immediately informing the central monitoring facility of the cause of the sensor means activation, immediately establishing two-way communication with the central monitoring facility, and immediately paging a vehicle occupant carrying a paging device associated with the mobile detection and alert system. The vehicle also includes a dashboard display which includes a plurality of visual indicating means, such as light emitting diodes or other lighting means, to alert the driver of sensor activation. The dashboard display also includes a push button or similar means to enable the driver to immediately establish two-way communication with the central monitoring facility, and a push button or similar means to enable the driver to immediately page a vehicle occupant carrying a paging device associated with the mobile detection and alert system.

The mobile detection and alert system preferably also includes a remote control transmitter. The remote control transmitter is a small hand-held battery powered unit and includes at least one command button and, preferably four command buttons. The remote control transmitter should be of a size that can be easily carried on the person of the vehicle operator. The remote control transmitter includes a small transmitter which may emit a radio frequency, infrared, ultrasonic, or other output signal. The remote control transmitter is actuated by depressing one or more command buttons. Once one or more command buttons are depressed an encoded signal specific to the associated mobile detection and alert system is transmitted and may travel up to a predetermined distance. The transmitted signal is encoded so that several different mobile detection and alert systems can be operated in the same local area without false triggering. Such signal encoding prevents the inadvertent initiation of the keyboard control unit controller resulting from stray signals similar to those employed in the present invention. Preferably, the transmitter includes four command buttons to enable a user to effect the functions "Stay Away—Arm", "Disarm", "Panic", and "Light", and "Medical Emergency". Such a transmitter enables a user to activate or deactivate the mobile detection and alert system inside or outside the vehicle.

Accordingly, it is a principal object of the invention to provide a mobile detection and alert system capable of establishing round-the-clock vehicle security, allowing immediate response in case of vehicle theft, an accident, vehicle breakdown, or other emergency.

It is another object of the invention to provide a mobile detection and alert system capable of sensing failure and/or restoral of vehicle electrical power.

It is an object of the invention to provide improved elements and arrangements thereof in a mobile detection and alert system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
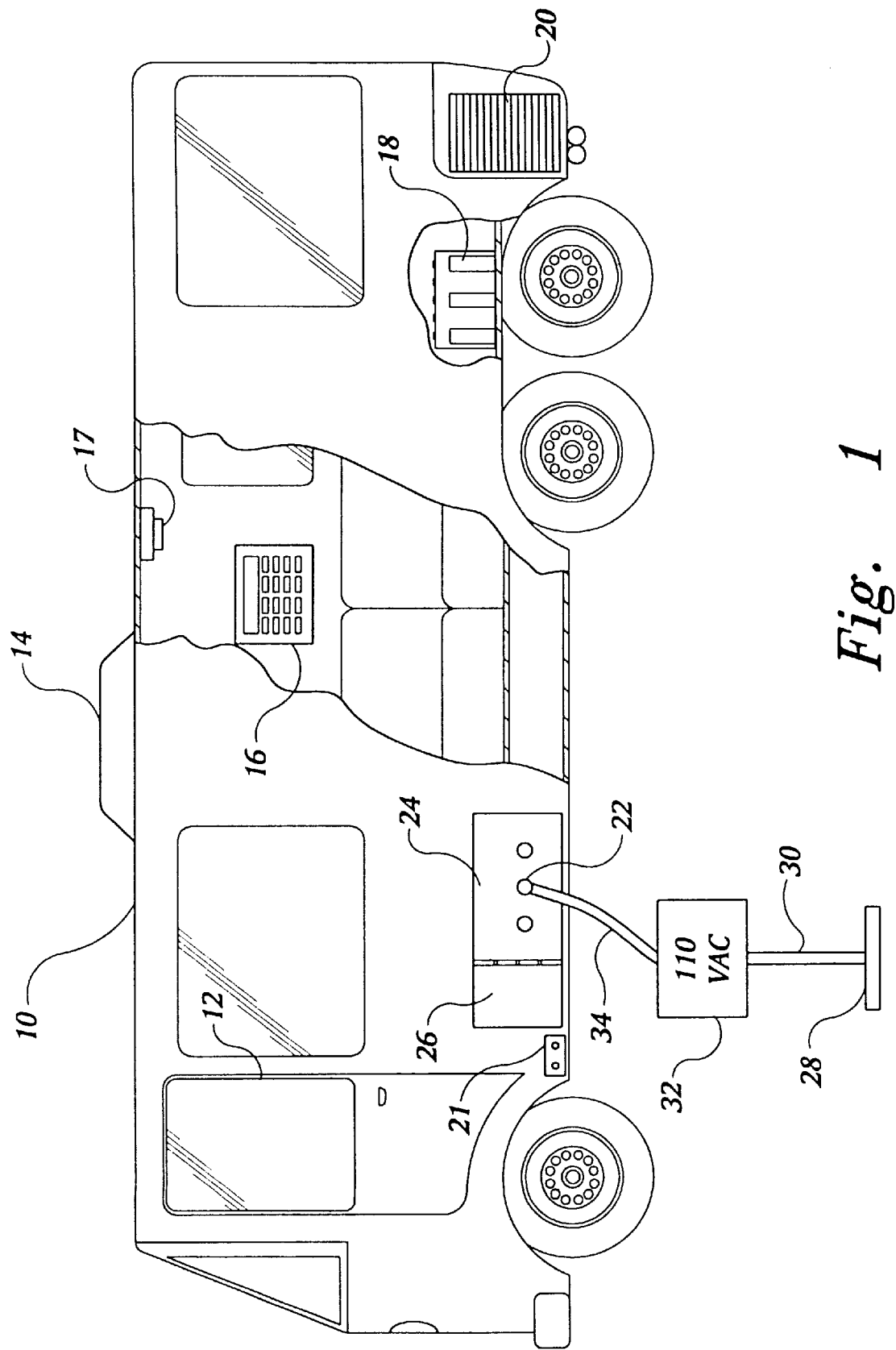
FIG. 1 is a partially schematic side elevational view of a recreational vehicle equipped with a mobile detection and alert system according to the invention.
Figure 2:
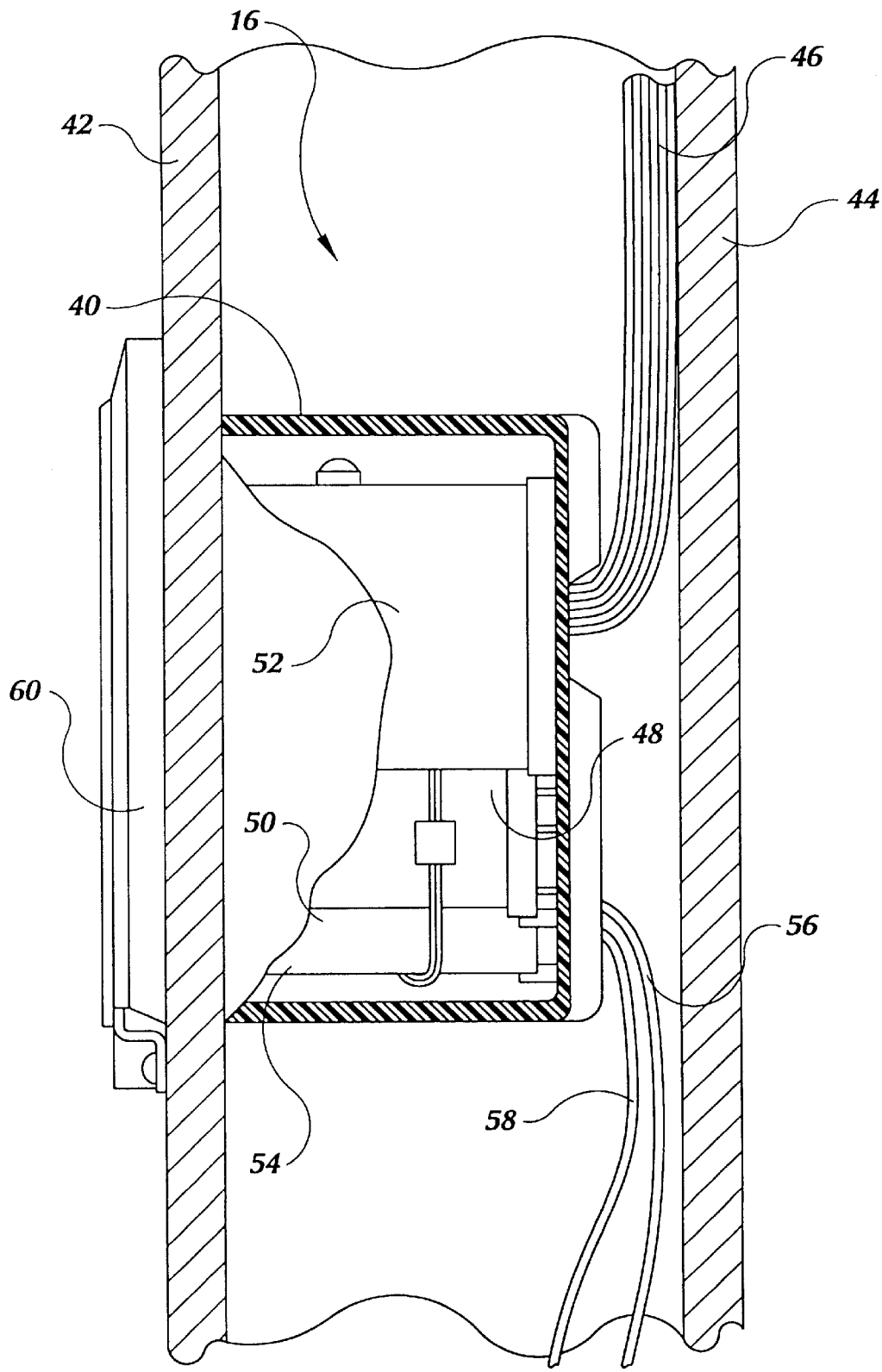
FIG. 2 is a partially schematic vertical cross-sectional view of a wall portion of the vehicle having a keyboard control unit mounted therein with portions thereof broken away.
Figure 3:
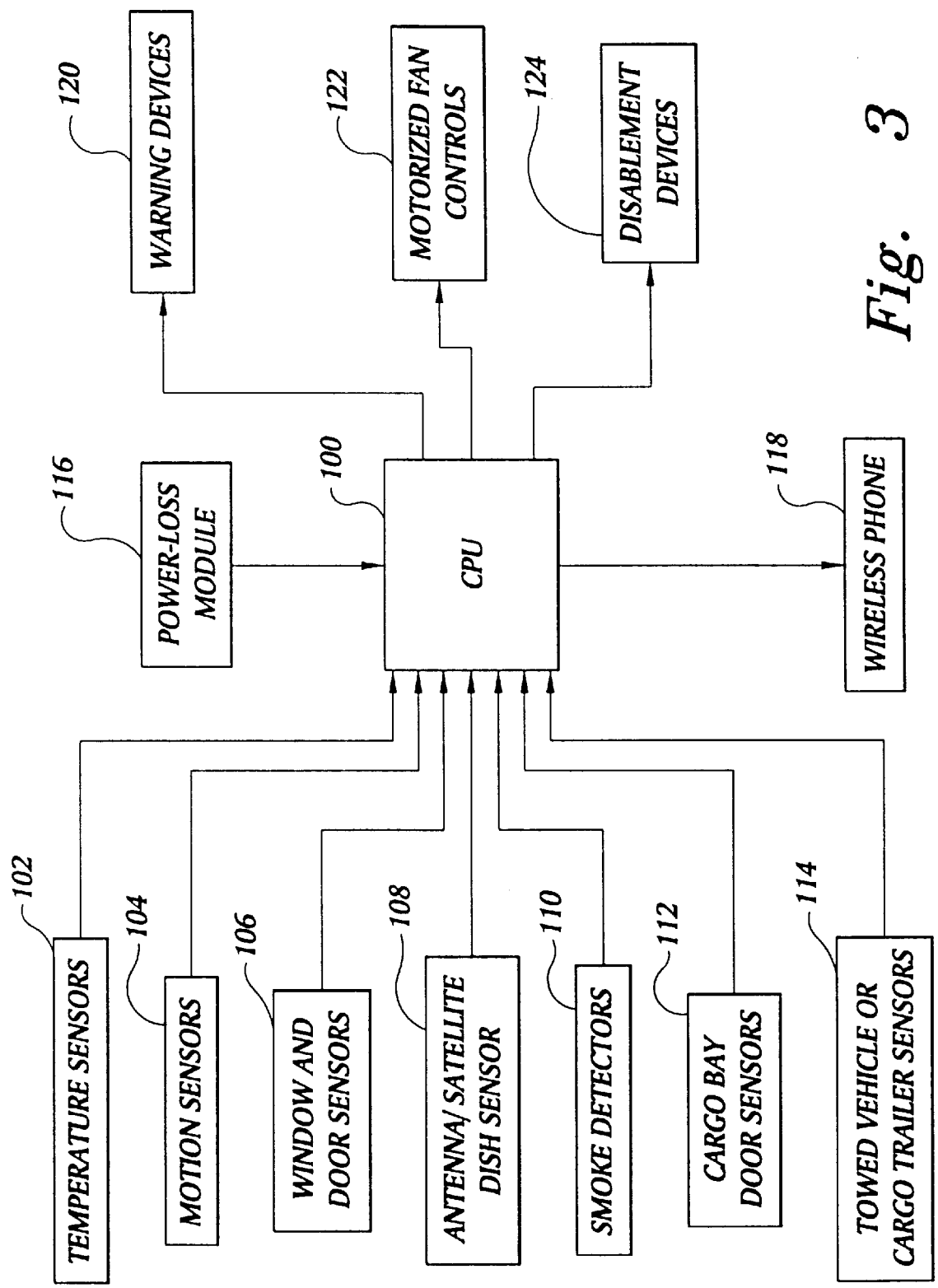
FIG. 3 is a block diagram of a mobile detection and alert system according to the invention.

The mobile detection and alert system according to the invention is particularly adapted for use in conjunction with a recreational vehicle, such as a boat, trailer, camper, or the like, and in FIG. 1 comprises a motor home 10. The mobile detection and alert system provides round-the-clock vehicle security, allowing immediate response in case of vehicle theft, an accident, vehicle breakdown, or other emergency. The motor home 10 includes 12 volt DC storage battery which is charged by an external power source or the alternator of the motor home 10 that is in turn driven by the vehicle engine 20, and is also connected through a wiring system with selected electrical appliances in the recreational vehicle, such as an interior light 17, etc. The motor home 10 may also include an additional 12 volt DC storage battery which is also charged by an external power source or the alternator of the motor home 10, and is also connected through a wiring system for powering selected electrical appliances in the recreational vehicle. The motor home 10 also includes external visual indicating means 21 in the form of any suitable lighting means to alert vehicle occupants whether vehicle power has failed or whether a vehicle sensor means has been activated.

Guardian and tracking functions are provided through a keyboard control unit 16 which is installed in the motor home 10. The keyboard control unit 16 communicates with a central monitoring facility in at least one-way, and preferably two-way, communication. Preferably, the keyboard control unit 16 provides vehicle theft and intrusion protection using an in-vehicle alarm and security system linked to the central monitoring facility by a transceiver in the keyboard control unit 16. The keyboard control unit 16 includes a keypad or other human interface device, allowing a vehicle driver or occupant to signal the central monitoring facility that a particular type of assistance is needed. The vehicle's location may be automatically transmitted to the central monitoring facility along with any automatic or manual request, the location being precisely determinable anywhere in the world. In this manner, the present invention is capable of providing continuous monitoring of a large number of vehicles for a broad range of status and emergency conditions over a virtually unlimited geographic area, also allowing manual communication of requests for assistance to that specific location. Advantageously, the system is implemented using existing location detection systems and conventional commercial or police communications equipment.

The keyboard control unit 16 is mounted in a housing in a sidewall of the vehicle. The size of the housing is suitably designed insofar as it may be conveniently fixed in a convenient location according to the desires of the user. The keyboard control unit 16 is powered by the vehicle's battery or an external power source and includes a power converter for converting AC power to DC power according to the power source employed, and a power inverter for converting DC power to AC power according to the power source employed. The keyboard control unit 16 may receive power from an alternate source of power, such as a backup battery. The keyboard control unit 16 also includes a vehicle power sensing means which may include a relay or other similar circuit. This power sensing means detects failure and/or restoral of the vehicle DC electrical power or the external AC electrical power. Upon detection of electrical failure, the keyboard control unit 16 activates an associated distress message through speakers internally and externally of the vehicle to attract the attention of the vehicle occupants or any local population, as well as immediately informing the central monitoring facility of the failure and/or restoral of vehicle electrical power, immediately establishing two-way communication with the central monitoring facility, and immediately paging a vehicle occupant carrying a paging device associated with the mobile detection and alert system.

The illustrated sidewall includes an interior wall 42 and an exterior wall 44 which are spaced apart a distance which is slightly greater than the depth of the keyboard control unit housing. The wiring system includes a plurality of individual wires 46 which connect each of the electrical appliances of the mobile home 10 with the keyboard control unit 16. The wiring system also includes a first conductor 56 which connects the same with the vehicle storage battery, and a second conductor 58 which connects the keyboard control unit 16 with a conventional external 110 VAC source of household current. In this example, the conductor 58 is connected with an outside receptacle or socket 22 which is mounted in a recessed area 24 on the exterior surface of the mobile home 10, and includes a hinged closure 26 therefore. The mobile home 10 is disposed adjacent to a source of 110 VAC electrical power, which is illustrated as a pedestal arrangement 30 with a weatherproof housing 32 mounted thereon, and an electrical conductor 34 interconnecting the power source 30 with the receptacle 22. The keyboard control unit 16 includes a power converter which is capable of converting the 110 VAC power source to 12 VDC power, and distributing the same to the motor home's electrical appliances through the wiring system. It is to be understood, however, that the present invention contemplates the use of alternative electrical components, capable of converting virtually any type of household current to a form compatible with the electrical system of any given recreational vehicle.

The basic electrical components of the power converter include a transformer, a rectifier, and a circuit breaker, each of which is electrically interconnected, and mounted in the housing. The transformer is a rather heavy component, and is adapted to alter the voltage of the source from 110 volts to 12 volts. The rectifier alters the power source characteristics from alternating current to direct current, which in conjunction with the transformer, provides the 12 volt DC current which is compatible with the vehicle's wiring system and electrical appliances. The circuit breaker is connected with the 110 VAC source through the conductor, and is adapted to open the circuit between 110 VAC source and 110 V loads upon exceeding a predetermined electrical current, such as 15 amps. Although a circuit breaker is contemplated in the illustrated embodiment, it is to be understood that the present invention contemplates the use of any suitable electrical fuse arrangement.

The keyboard control unit 16 includes a display module including an alphanumeric display. The display module provides means for displaying requested information and verifying operator input. While a liquid crystal display is suitable for this purpose, any display configuration known in the art may also be employed. The keyboard control unit 16 includes a keypad which functions as an operator interface device allowing the operator to input data and to control the keyboard control unit 16. The keypad also includes a plurality of multi-function control keys.

The keyboard control unit 16 includes a CPU 100. The CPU 100 includes sufficient memory to store both non-variable data related to the region of vehicle operation and variable data related to current conditions. The keypad is connected to the CPU 100 to provide input data and operator commands to the CPU 100. The display module is connected to the CPU 100 to supply information output to the operator and to supply operator interface information.

Major known electrical components are mounted within the keyboard control unit 16. Such components include a printed circuit board mounted in firm support within the keyboard control unit 16. The circuit board carries certain coupling and driver electronics with the CPU 100, read-only memories (ROM) and random access memories (RAM). In general, the ROM memories are used to contain instructions and programs while the RAM memories are employed for operating and working data. Of course, movement and process of instructions as well as data is controlled and accomplished by the CPU 100. The CPU 100 is connected to all the keys on the keypad and is variously connected to the other elements of the keyboard control unit. The memories are connected to the CPU 100 through several signal paths. The keyboard control unit 16 also includes conventional elements whose functions are not critical to an understanding of the present invention. For example, optical isolators, level translators, crystal oscillators, buffers, bus transceivers, drivers, protection circuits, voltage regulators, and other auxiliary functional circuits are omitted from the present specification, for the sake of clarity. Those skilled in the art are readily capable of implementing the present invention, given the present discussion.

The keyboard control unit 16 includes an input unit responsive to an event or condition associated with the vehicle, and that provides information describing the event or condition to the central monitoring facility. An event or condition associated with the vehicle may include unauthorized entry, glass breakage, fire, smoke, unauthorized movement, temperature conditions, carbon monoxide conditions, interior temperature conditions, battery temperature conditions, transmission temperature conditions, levelling jack conditions, satellite antenna conditions, cargo door conditions, etc. Such events or conditions are detected by a plurality of sensors operatively associated with the keyboard control unit 16, each sensor being structured to be actuated by the occurrence of a predetermined event. The keyboard control unit 16 also has a satellite receiver, preferably a GPS receiver, responsive to navigation signals transmitted by a satellite navigation system, and providing information describing the vehicle's location based on the navigation signals.

Also, the keyboard control unit 16 has a keyboard control unit controller which is responsive to the input unit and the satellite receiver. The keyboard control unit controller includes a transceiver for transmitting and receiving information on a communications link 206, as well as a phone voice module which provides user interface via any touch tone standard voice grade phone line, for the purpose of system interrogation, remote arming/disarming, remote control of generator and temperature controls, in addition to uploading and downloading program information, the information transmitted on the communications link 206 or the phone voice module including both the information describing the event or condition and the information describing the vehicle's location, the keyboard control unit controller automatically inserting the information describing the vehicle's location into the information transmitted onto the communications link 206 or the phone voice module. The information received on the communications link 206 or the phone voice module includes communications from the central monitoring facility 200, a wireless telephone, a telephone connected to any touch tone standard voice grade phone line, or a remote control transmitter. The satellite receiver is adapted to receive and decode signals transmitted by the central monitoring facility 200, a wireless telephone, a telephone connected to any touch tone standard voice grade phone line, or a remote control transmitter. Upon receipt of a valid transmitted signal, the receiver outputs an appropriate signal to the keyboard control unit controller for disabling or enabling associated relays. To preserve the data contents of volatile memory in the keyboard control unit controller, a memory back-up battery is provided. A GPS antenna is provided external to the keyboard control unit controller.

The communications link 206 is preferably implemented as a conventional analog or digital cellular telephone link, but of course need not be so limited. The central monitoring facility 200 may appropriately summon help in the form of police, a fire truck, an ambulance, a wrecker, or other appropriate help. In addition, the central monitoring facility 200 may communicate with the vehicle occupant's to determine their condition. Each keyboard control unit 16 preferably includes means for determining the present location of the vehicle in which it is installed. Preferably, this means for determining the location is a GPS receiver, not only for its accuracy but because the location information transmitted from GPS satellites is provided free of cost. The central monitoring facility 200 is equipped with a reference GPS receiver to provide selectable real-time error correction of the measurements of the location of the vehicles, using different GPS techniques. The mobile detection and alert system also includes a GPS antenna which is connected to the GPS receiver.

Figure 4:
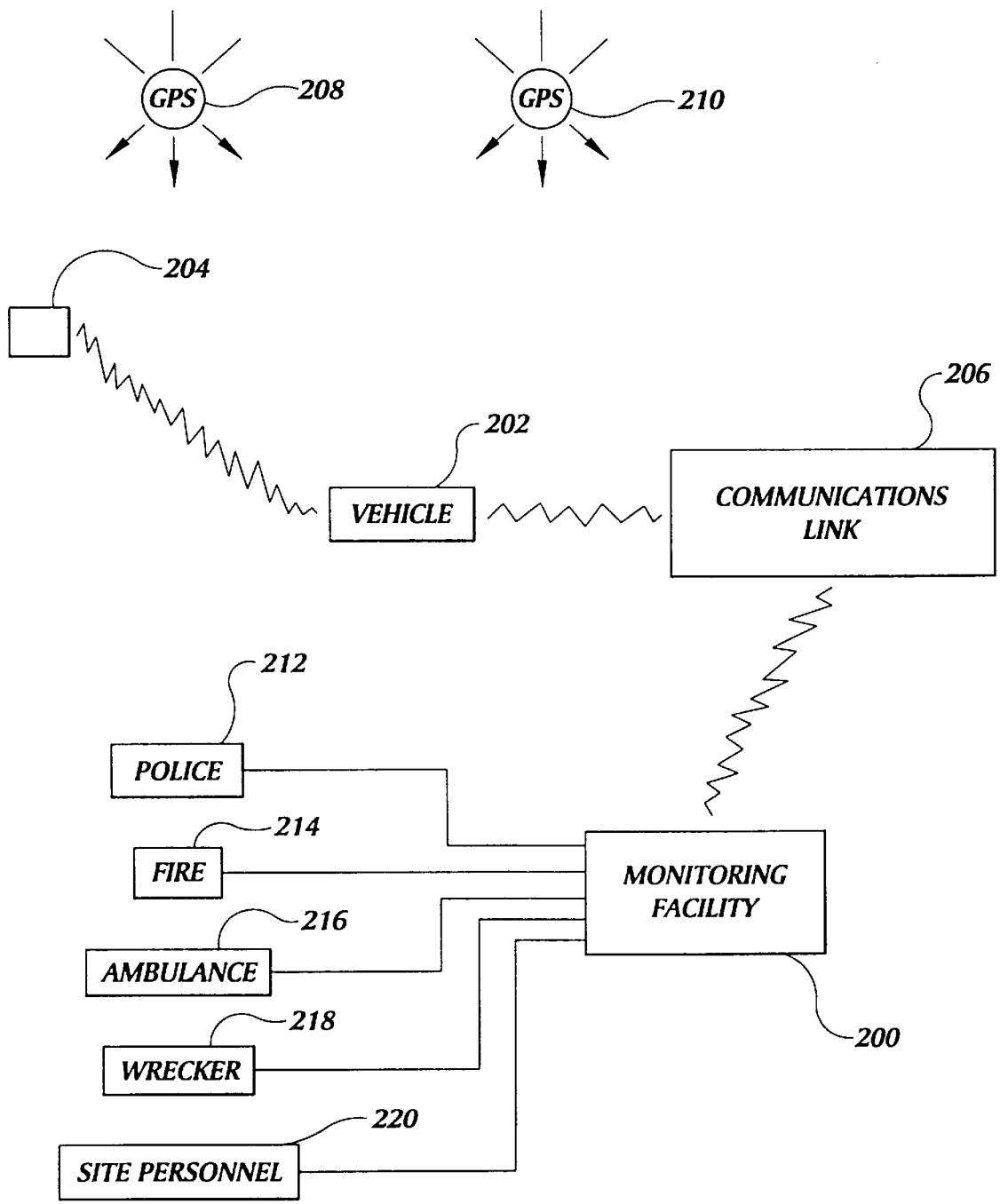
FIG. 4 is a block diagram of a mobile detection and alert system according to the invention.

As readily appreciated by those skilled in the art, the GPS was developed by the U.S. Department of Defense and placed into service in the 1980's. The GPS includes a constellation of radio-navigation satellites which constantly transmit precise timing and location information to substantially the entire surface of the earth. The GPS receiver in the keyboard control unit 16 is preferably implemented using a multi-channel GPS receiver so as to acquire many (for example, five) transmissions from a corresponding plurality of GPS satellites simultaneously. This allows the keyboard control unit 16 to determine the location of the vehicle (within approximately 20 meters), velocity (to within 0.1 mph), and direction of motion, for possible transmission to the central monitoring facility 200. Various GPS satellites 208, 210 are schematically illustrated in FIG. 4.

The mobile detection and alert system includes a plurality of sensor means 102,104,106,108,110,112,114 for detecting events or conditions such as unauthorized entry, glass breakage, fire, smoke, unauthorized movement, temperature conditions, carbon monoxide conditions, interior temperature conditions, battery temperature conditions, transmission temperature conditions, levelling jack conditions, satellite antenna conditions, cargo door conditions, etc. The plurality of sensor means 102,104,106,108,110,112,114 are operatively associated with the keyboard control unit 16, each sensor means being structured to be actuated by the occurrence of a predetermined event. Upon actuation, each sensor means activates a corresponding distress message through speakers internally and externally of the vehicle to attract the attention of the vehicle occupants or any local population, as well as immediately informing the central monitoring facility of the cause of the sensor means activation, immediately establishing two-way communication with the central monitoring facility, and immediately paging a vehicle occupant carrying a paging device associated with the mobile detection and alert system.

For example, a sensor means may be employed for detecting the concentration of carbon monoxide in the passenger compartment of the vehicle. The carbon monoxide sensor means would provide a signal via a line to an analog signal conditioner. The voltage of the signal from the carbon monoxide sensor means would be proportional to the concentration of carbon monoxide present in the compartment. The analog signal conditioner would compare the voltage of the carbon monoxide sensor means signal to a predetermined level. The predetermined level would correspond to a concentration of carbon monoxide which is hazardous to human health or otherwise undesirable. The analog signal conditioner could also output a signal to open a ceiling outlet and automatically activate a ceiling exhaust fan to remove polluted air from the compartment. Upon activation, the carbon monoxide sensor means would activate a corresponding distress message through speakers internally and externally of the vehicle to attract the attention of the vehicle occupants or any local population, as well as immediately informing the central monitoring facility of the carbon monoxide conditions in the vehicle, immediately establishing two-way communication with the central monitoring facility, and immediately paging a vehicle occupant carrying a paging device associated with the mobile detection and alert system.

A temperature sensor means may be employed for detecting the interior temperature in the passenger compartment of the vehicle. The temperature sensor means would provide a signal via a line to an analog signal conditioner. The voltage of the signal from the temperature sensor means would be proportional to the temperature in the compartment. The analog signal conditioner would compare the voltage of the temperature sensor means signal to predetermined high and low levels. The predetermined levels would correspond to high or low temperatures which are hazardous to human health or otherwise undesirable. The analog signal conditioner could also output a signal to open a ceiling outlet and automatically activate a ceiling exhaust fan to remove hot air from the compartment and a ceiling fan to provide fresh air to the compartment. Upon activation, the temperature sensor means would activate a corresponding distress message through speakers internally and externally of the vehicle to attract the attention of the vehicle occupants or any local population, as well as immediately informing the central monitoring facility of the temperature conditions in the vehicle, immediately establishing two-way communication with the central monitoring facility, and immediately paging a vehicle occupant carrying a paging device associated with the mobile detection and alert system.

A motion sensor means may be employed for detecting movement within the passenger compartment of the vehicle. The motion sensor would preferably be a passive infrared motion detector. Such detectors have about a 120° arc and about a 50 foot range detection zone. However, motion detectors are known having a different arc or range detection zone, such as up to 500 feet. Suitable alternate motion detectors may also be utilized, such as ultrasonic, optical, microwave, or video motion detectors. Additional alternative types of motion detectors which may also be utilized to sense intrusion include laser scanning or frequency sensitive detectors, commonly referred to as "glass breaks". Upon activation, the motion sensor means would activate a corresponding distress message through speakers internally and externally of the vehicle to attract the attention of the vehicle occupants or any local population, as well as immediately informing the central monitoring facility of the motion sensor detections, immediately establishing two-way communication with the central monitoring facility, and immediately paging a vehicle occupant carrying a paging device associated with the mobile detection and alert system. As stated above, other sensor means may also be employed for detecting other events or conditions such as unauthorized entry, glass breakage, fire, smoke, battery temperature conditions, transmission temperature conditions, levelling jack conditions, satellite antenna conditions, cargo door conditions, etc.

Figure 5:
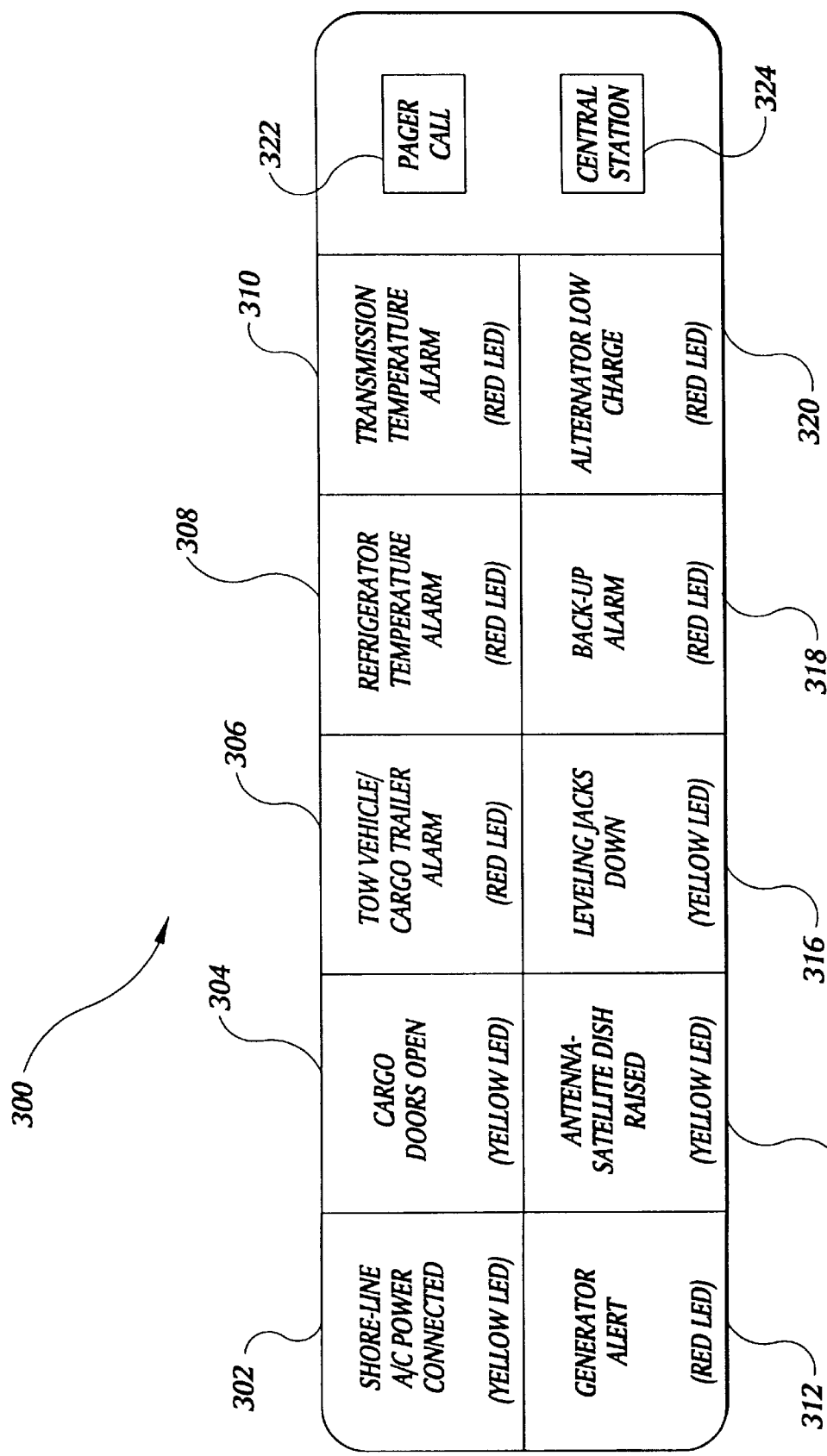
FIG. 5 is a front view of a dashboard display according to the invention.

The vehicle also includes a dashboard display which includes a plurality of visual indicating means, such as light emitting diodes (LEDs) or other lighting means, to alert the driver of sensor activation. The dashboard display also includes a push button or similar means to enable the driver to immediately page the central monitoring facility or a vehicle occupant carrying a paging device associated with the mobile detection and alert system. An example of such a dashboard display 300 is shown in FIG. 5. The dashboard display 300 includes visual indicating means in the form of LEDs for indicating "Shore-Line A/C Power Connected" (yellow LED) 302, "Cargo Doors Open" (yellow LED) 304, "Tow Vehicle/Cargo Trailer Alarm" (red LED) 306, "Refrigerator Temperature Alarm (red LED) 308, "Transmission Temperature Alarm" (red LED) 310, "Generator Alert" (red LED) 312, "Antenna-Satellite Dish Raised" (yellow LED) 314, "Leveling Jacks Down" (yellow LED) 316, "Back-Up Alarm" (red LED) 318, and "Alternator Low Charge" (red LED) 320. The dashboard display 300 also includes a "Pager Call" push button 322 to enable the driver to immediately page a vehicle occupant carrying a paging device associated with the mobile detection and alert system, and a "Central Station" push button 324 to enable the driver to immediately page the central monitoring facility.

The mobile detection and alert system preferably also includes a remote control transmitter 204, as shown in FIG. 4. The remote control transmitter 204 is a small hand-held battery powered unit and includes at least one command button and, preferably four command buttons. The remote control transmitter 204 should be of a size that can be easily carried on the person of the vehicle operator. The remote control transmitter 204 includes a small transmitter which may emit a radio frequency, infrared, ultrasonic, or other output signal. The remote control transmitter 204 is actuated by depressing one or more command buttons. Once one or more command buttons are depressed an encoded signal specific to the associated mobile detection and alert system is transmitted and may travel up to a predetermined distance. The transmitted signal is encoded so that several different mobile detection and alert systems can be operated in the same local area without false triggering. Such signal encoding prevents the inadvertent initiation of the keyboard control unit controller resulting from stray signals similar to those employed in the present invention. Preferably, the transmitter 204 includes four command buttons to enable a user to effect the functions "Stay Away—Arm", "Disarm", "Panic", and "Light", and "Medical Emergency". Such a transmitter enables a user to activate the mobile detection and alert system inside or outside the vehicle.

It is to be understood that the present invention is not limited to the sole embodiments described above, but encompasses any and all embodiments within the scope of the following claims.

I claim:
1. A mobile detection and alert system comprising:
    a keyboard control unit input unit responsive to an event or condition associated with a vehicle and for providing information describing the event or condition;
    a plurality of sensor means operatively connected with said keyboard control unit input unit for detecting an event or condition associated with the vehicle;
    a satellite receiver responsive to navigation signals transmitted by a satellite navigation system and for providing information inherently describing the vehicle's location based on the navigation signals;
    a keyboard control unit controller operatively connected with and responsive to said keyboard control unit input unit and said satellite receiver, said keyboard control unit controller including a wireless transmitter and a phone voice module, wherein said wireless transmitter is for transmitting information onto a communications link, the information transmitted on the communications link including both the information describing the event or condition and information inherently describing the vehicle's location, and wherein said phone voice module provides user interface via any touch tone standard voice grade phone line, for the purpose of system interrogation, remote arming/disarming, remote control of generator and temperature controls, and uploading and downloading of program information; and,
    a central monitoring facility for providing round-the-clock vehicle monitoring.

2. A mobile detection and alert system according to claim 1, wherein said communications link is an analog cellular telephone link.

3. A mobile detection and alert system according to claim 1, wherein said communications link is a digital cellular telephone link.

4. A mobile detection and alert system according to claim 1, wherein said sensor means comprise mechanical, electrical or magnetic means.

5. A mobile detection and alert system according to claim 1, wherein said sensor means detects events or conditions selected from the group consisting of unauthorized entry, glass breakage, fire, smoke, unauthorized movement, temperature conditions, carbon monoxide conditions, interior temperature conditions, battery temperature conditions, transmission temperature conditions, levelling jack conditions, satellite antenna conditions, and cargo door conditions.

6. A mobile detection and alert system according to claim 1, wherein said sensor means activate at least one distress message internally and externally of the vehicle upon detection of an event or condition associated with the vehicle.

7. A mobile detection and alert system according to claim 1, further comprising a plurality of visual indicating means to alert an occupant of the vehicle of sensor activation.

8. A mobile detection and alert system according to claim 7, wherein said visual indicating means include a "Shore-Line A/C Power Connected" yellow light emitting diode, a "Cargo Doors Open" yellow light emitting diode, a "Tow Vehicle/Cargo Trailer Alarm" red light emitting diode, a "Refrigerator Temperature Alarm" red light emitting diode, a "Transmission Temperature Alarm" red light emitting diode, a "Generator Alert" red light emitting diode, an "Antenna-Satellite Dish Raised" yellow light emitting diode, a "Leveling Jacks Down" yellow light emitting diode, a "Back-Up Alarm" red light emitting diode, and an "Alternator Low Charge" red light emitting diode.

9. A mobile detection and alert system according to claim 1, further comprising means that enables an occupant of the vehicle to immediately establish two-way communication with said central monitoring facility.

10. A mobile detection and alert system according to claim 1, further comprising means that enables an occupant of the vehicle to immediately page a vehicle occupant carrying a paging device associated with the mobile detection and alert system.

11. A mobile detection and alert system according to claim 1, further comprising paging means associated with said mobile detection and alert system for alerting a vehicle occupant of sensor activation.

12. A mobile detection and alert system according to claim 1, further comprising means that enables a driver of said vehicle to immediately page a vehicle occupant carrying a paging means associated with said mobile detection and alert system.

13. A mobile detection and alert system according to claim 1, further comprising a remote control transmitter that enables a user to remotely activate or deactivate said mobile detection and alert system.

14. A mobile detection and alert system according to claim 13, wherein said remote control transmitter includes at least one command button.

15. A mobile detection and alert system according to claim 13, wherein said remote control transmitter is battery powered.

16. A mobile detection and alert system according to claim 13, wherein said remote control transmitter is capable of emitting a signal selected from the group consisting of a radio frequency signal, an infrared signal, and an ultrasonic signal.

* * * * *